(12) United States Patent
Lee et al.

(10) Patent No.: US 10,713,257 B2
(45) Date of Patent: Jul. 14, 2020

(54) DATA-CENTRIC REDUCTION NETWORK FOR CLUSTER MONITORING

(71) Applicant: International Business Machines Corporation, Armonk, NY (US)

(72) Inventors: Eun Kyung Lee, Yorktown Heights, NY (US); I-Hsin Chung, Yorktown Heights, NY (US); Yoonho Park, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 337 days.

(21) Appl. No.: 15/720,345

(22) Filed: Sep. 29, 2017

(65) Prior Publication Data

US 2019/0102432 A1    Apr. 4, 2019

(51) Int. Cl.
*G06F 16/2455* (2019.01)
*G06F 16/215* (2019.01)
*G06F 16/28* (2019.01)
*G06F 17/18* (2006.01)

(52) U.S. Cl.
CPC ...... *G06F 16/24556* (2019.01); *G06F 16/215* (2019.01); *G06F 16/285* (2019.01); *G06F 17/18* (2013.01)

(58) Field of Classification Search
CPC ............. G06F 16/24556; G06F 16/285; G06F 16/215; G06F 17/18
USPC ........................................................ 707/692
See application file for complete search history.

(56) References Cited

U.S. PATENT DOCUMENTS

| 8,195,628 B2 | 6/2012 | Sim-Tang |
| 8,781,768 B2 | 7/2014 | Gershinsky et al. |
| 10,305,758 B1* | 5/2019 | Bhide ................. G06F 16/2477 |
| 2011/0184676 A1* | 7/2011 | Gershinsky ............. H04Q 9/00 702/62 |
| 2013/0097125 A1* | 4/2013 | Marvasti ................. G06F 16/90 707/692 |
| 2013/0318122 A1 | 11/2013 | Jackson |
| 2017/0284839 A1* | 10/2017 | Ojala ..................... G01D 21/00 |

FOREIGN PATENT DOCUMENTS

WO    WO 2014019624 A1    2/2014

OTHER PUBLICATIONS

Mel, et al. "The NIST Definition of Cloud Computing". Recommendations of the National Institute of Standards and Technology. Nov. 16, 2015.

(Continued)

*Primary Examiner* — Evan Aspinwall
(74) *Attorney, Agent, or Firm* — Daniel P. Morris; McGinn IP Law Group, PLLC

(57) ABSTRACT

A data-centric reduction method, system, and computer program product include configuring a similarity threshold and a correlation threshold for an entire data set from at least two back-end nodes, reducing the entire data set to a reduced data set from the at least two back-end nodes sent to a front-end node by removing data based on the similarity threshold and the correlation threshold, and after the front-end receives the reduced data set, reconstructing the entire data set from the reduced data set using the similarity threshold and correlation threshold.

20 Claims, 6 Drawing Sheets

(56) References Cited

OTHER PUBLICATIONS

Siemens et al.; "High Performance Co-operative Cluster Computing through Migration of Jobs of Computing Nodes"; http://ip.com/IPCOM/000212445D; Nov. 14, 2011.
IBM; "Method for visually empashizing clusters in network diagrams"; http://ip.com/IPCOM/000190153D; Nov. 18, 2009.

* cited by examiner

CONFIGURING A SIMILARITY THRESHOLD AND A CORRELATION THRESHOLD FOR AN ENTIRE DATA SET FROM AT LEAST TWO BACK END NODES — 101

MONITORING A SIMILARITY AND A CORRELATION OF THE ENTIRE DATA SET AT EACH BACK END NODE TO CALCULATE SIMILARITY TO LIMIT SIMILAR DATA ON EACH STREAM, AND THE FRONT END NODE CALCULATES CORRELATION COEFFICIENTS BETWEEN DIFFERENT BACK END DATA SETS CONSTITUTING THE ENTIRE DATA SET AND GENERATES A CORRELATION TABLE TO IDENTIFY THE CORRELATIONS — 102

REDUCING THE ENTIRE DATA SET TO A REDUCED DATA SET FROM THE AT LEAST TWO BACK END NODES SENT TO A FRONT END NODE BY REMOVING DATA BASED ON THE SIMILARITY THRESHOLD AND THE CORRELATION THRESHOLD — 103

AFTER THE FRONT END RECEIVES THE REDUCED DATA SET, RECONSTRUCTING THE ENTIRE DATA SET FROM THE REDUCED DATA SET USING THE SIMILARITY THRESHOLD AND CORRELATION THRESHOLD — 104

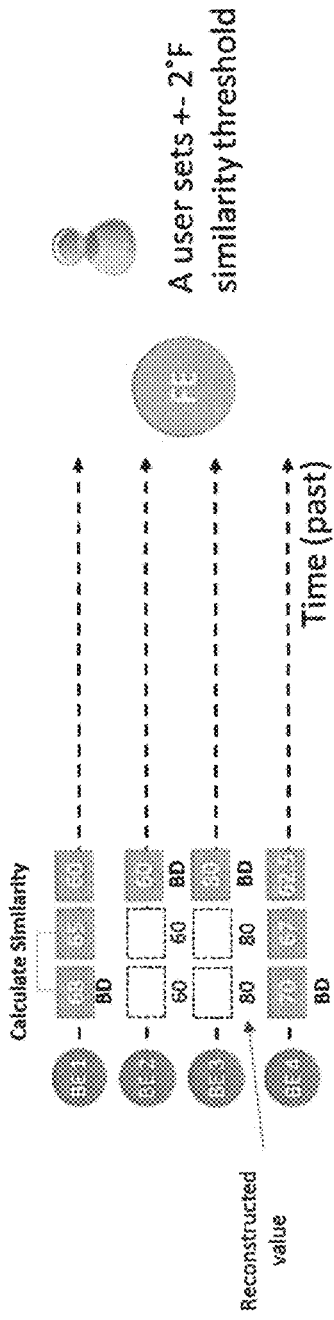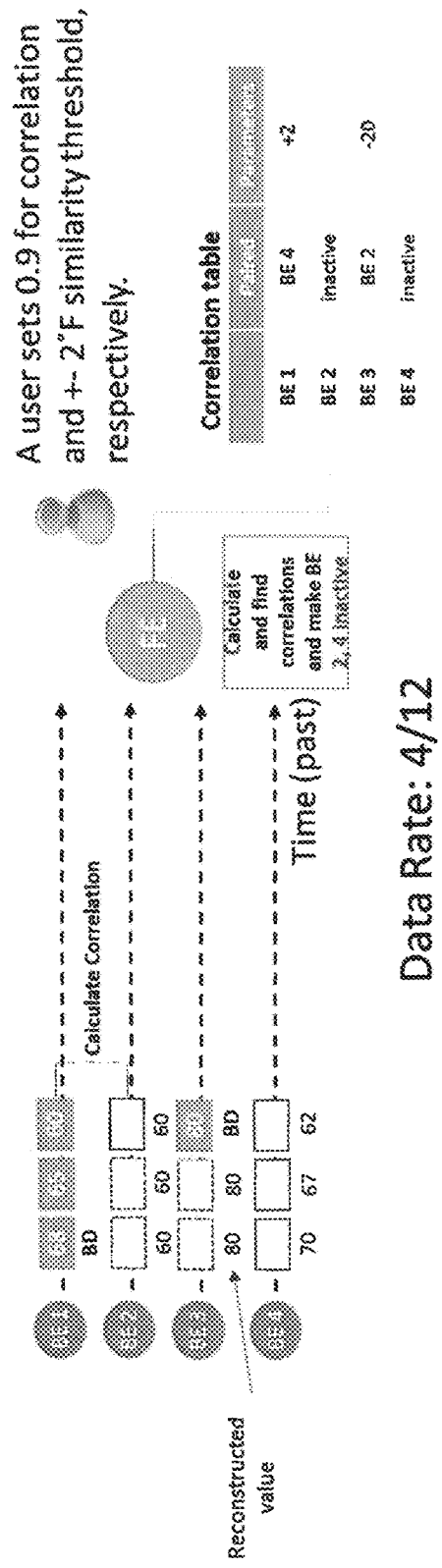

DATA-CENTRIC REDUCTION NETWORK FOR CLUSTER MONITORING

BACKGROUND

The present invention relates generally to a data-centric reduction method, and more particularly, but not by way of limitation, to a system, method, and computer program product for reducing/compressing data generated from a plurality of sensors.

Conventionally, sensors and hardware counters implemented in modern computers generate massive data in terms of volume, velocity, and variability. The increasing amount of data transferred to the network results in overhead in a computing cluster such as implemented in high performance computing (HPC). This overhead may lead to unexpected noise that impacts running applications. However, the data contains redundancy. A data stream might report similar values for periods of time or different data streams might be strongly correlated, making all but one of them redundant. Therefore, the inventors have identified that there is a need in the art for reducing and/or compressing data generated from the plurality of sensors.

SUMMARY

In an exemplary embodiment, the present invention can provide a computer-implemented data-centric reduction method. The method includes configuring a similarity threshold and a correlation threshold for an entire data set from at least two back-end nodes, reducing the entire data set to a reduced data set from the at least two back-end nodes sent to a front-end node by removing data based on the similarity threshold and the correlation threshold, and after the front-end receives the reduced data set, reconstructing the entire data set from the reduced data set using the similarity threshold and correlation threshold. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 exemplarily shows a high-level flow chart for a data-centric reduction method 100 according to an embodiment of the present invention;

FIG. 2A-2D exemplarily depicts one embodiment of the present invention;

DETAILED DESCRIPTION

Figure 2A:
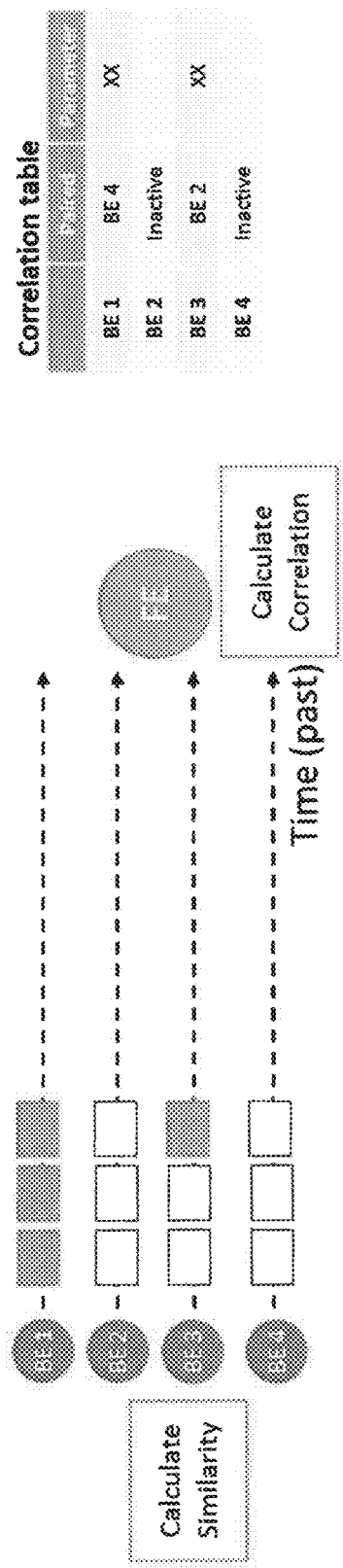

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a data-centric reduction method 100 according to the present invention can include various steps for reducing data of a cluster of computers that forms a network with a hierarchical topology, with a front-end node (FE, parent) and at least two back-end nodes (BEs, children). Data generated from the BEs may be transferred to the FE. The embodiments describe herein may reduce data from the BEs to the FE by removing similar and/or correlated data (redundancy) in time and space based on user-specified tolerance thresholds.

Figure 3:
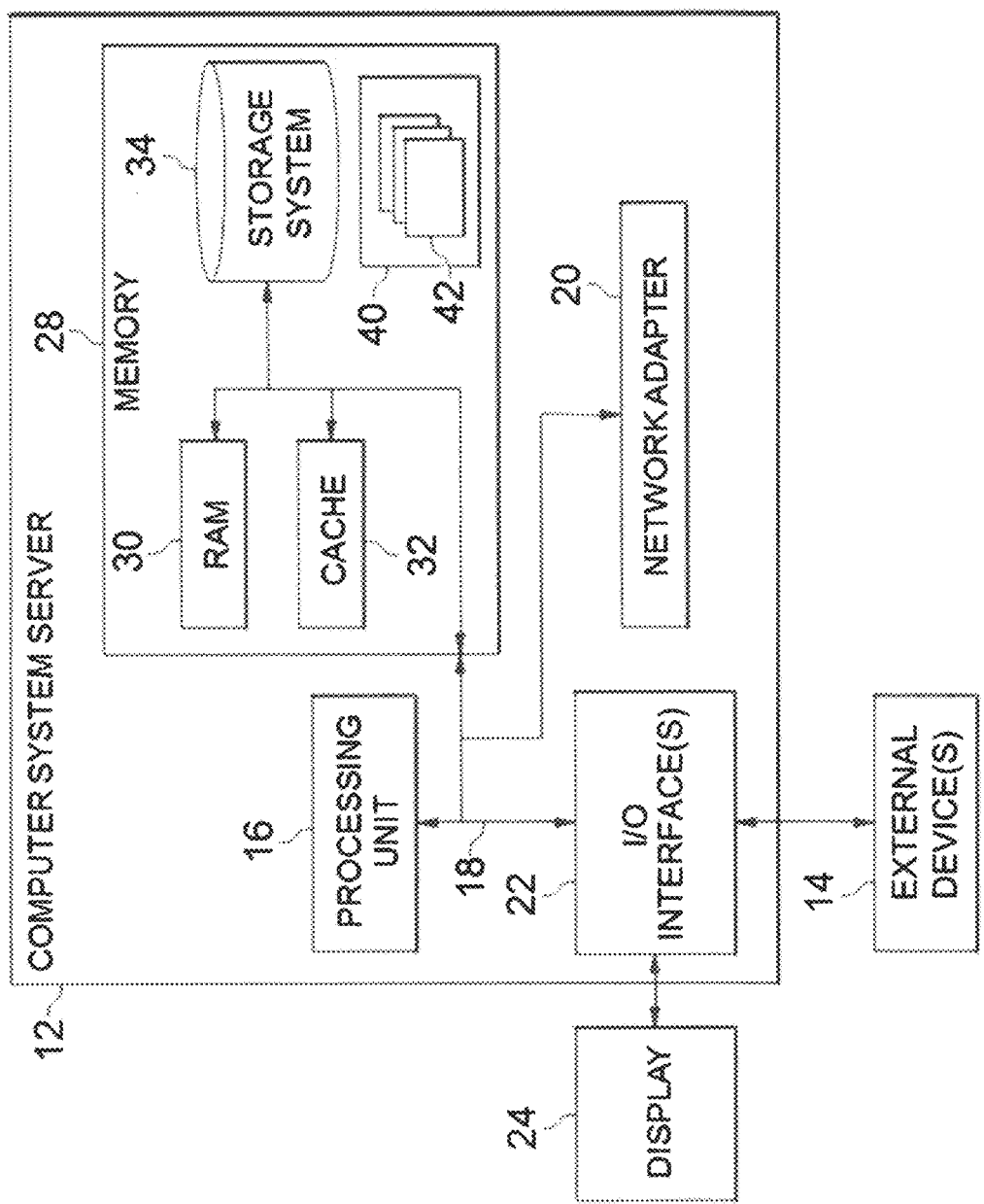
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Referring to FIG. 1, in step 101, a similarity threshold and a correlation threshold are configured for an entire data set from at least two back-end nodes. A user may set the similarity and correlation thresholds on the front-end node, which propagates them to the back-end node.

In step 102, a similarity and a correlation of the entire data set are monitored at each back-end node to calculate similarity for the ultimate purpose of limiting similar data on each stream, and the front-end node calculates correlation coefficients between different back-end data sets constituting the entire data set and generates a correlation table to identify the correlations. In other words, a similarity between data points of a data stream for one back-end node is determined. Then, a correlation between each data stream of individual nodes is compared to attempt to remove some of the data from one back-end node correlated to a second back-end node. It is noted that the similarity check and the correlation check can each be individually performed or both performed and are not a function of each other. Preferably, both are performed for optimal data reduction.

That is, in step 102, the similarity is calculated to limit similar data on each stream, and the front-end calculates correlation coefficients between different back-end node data streams and generates a correlation table to identify their correlations.

In step 103, the entire data set is reduced to a reduced data set from the at least two back-end nodes sent to a front-end node by removing data based on the similarity threshold and the correlation threshold. Based on the correlation table, the front-end node makes correlated back-end nodes inactive. A back-end node sends the data only if the similarity value is more than the similarity threshold and the back-end node is active (not correlated to another BE).

In step 104, after the front-end node receives the reduced data set, the entire data set is reconstructed from the reduced data set using the similarity threshold and correlation threshold. Therefore, the front-end node may reconstruct the entire data set using the similarity and correlation thresholds and the correlation table with the reduced data set received by the front-end node.

It is noted that the reducing reduces the data set by removing all data points within the similarity threshold from the individual back-end data stream and removing all data points within the correlation threshold of other individual back-end streams. Also, the eliminated data points via the correlation threshold are recorded in a correlation table for the reconstructing to utilize the correlation table to reconstruct the correlated data points.

Referring now to FIGS. 2A-2D, the topology can be a multi-level tree with intermediate nodes placed between the FE and BEs. The user can be a person (e.g., domain specialist) or system software, who/which is well aware of the system generated data. As shown in FIG. 2A, a shaded box indicates a real data value sent to the FE. A blank box indicates a data value discarded because either the value is similar to the previous baseline data or the corresponding data stream is correlated to another data stream. Also, a correlation table is depicted at the FE that maintains the status of each BE data stream. The paired column shows whether a BE is active or paired with another data stream. The parameter column contains any configuration parameter defining the correlation (i.e., sampling rate and size, linear relation). The correlation table will be used to reconstruct the original data at the FE.

Figure 2B:
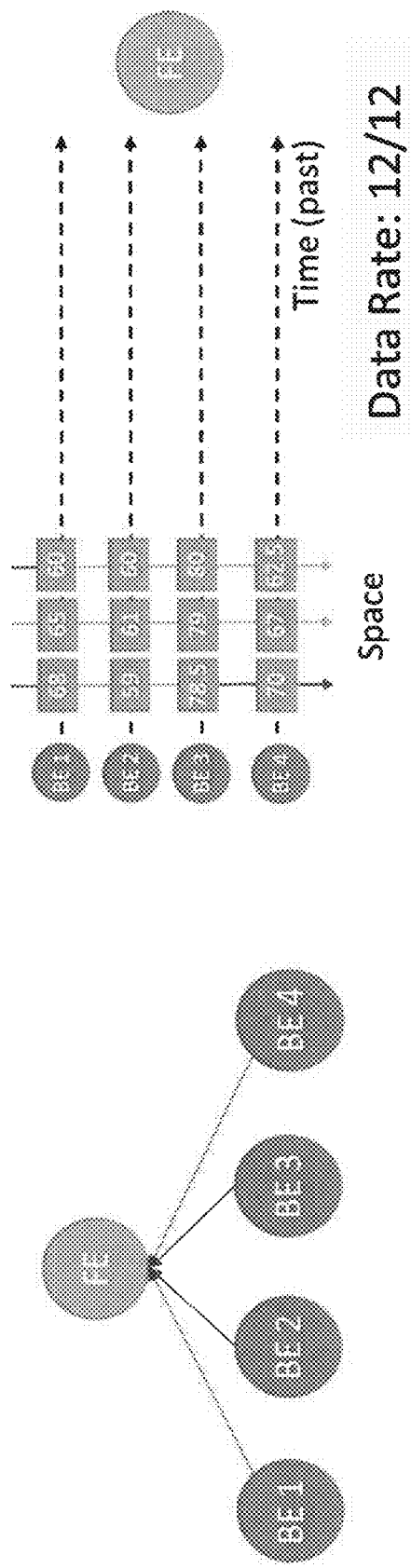

Referring now to FIG. 2B, a data set of 12 data points is depicted (i.e., four BEs each having 3 data points). As shown in FIG. 2C, a BE sends the current data to the FE only if current data differs from the baseline data by more than the similarity threshold. Otherwise, the BE does not send data to the FE. Baseline data (BD) is the actual data sent to the FE most recently. Thus, as depicted in FIG. 2C, the data is reduced from a 12 data point set to an 8 data point set that can be reconstructed to the 12 data point set at the FE.

Referring now to FIG. 2D, the FE calculates BE's data correlation. If one BE's data is correlated with another BE's data, the FE makes one BE inactive (i.e., inactive for purposes of the data only while the BE is still "active" as a node, in other words, the data stream is inactive as indicated by the shaded boxes in FIG. 2D) and only the active BE sends data to the FE. The example shows BE 1 and BE 0.3 are correlated with BE 4 and BE 2, respectively. This solution assumes same sampling rate and linear correlation. An inactive BE periodically becomes active and the FE checks the data sanity. The correlation table combined with thresholds is used to reconstruct the original data.

It is noted that Similarity of data stream x is defined as follows in Equation (1):

$$d_x = |x_t - x_{t-1}| \quad (1)$$

Correlation between data streams x and y is defined as follows in Equation (2):

$$r_{x,y} = \frac{\sum_{t=1}^{n} (x_t - \bar{x})(y_t - \bar{y})}{\sqrt{\sum_{t=1}^{n} (x_t - \bar{x})^2} \sqrt{\sum_{t=1}^{n} (y_t - \bar{y})^2}} \quad (2)$$

Where datasets $x = \{x_1, \ldots, x_n\}$ and $y = \{y_1, \ldots, y_n\}$ each contain finite n values. Number of samples, n, has to be carefully chosen for different hardware platforms. A large number n may cause computational overhead to the system, which may outweigh the advantage (i.e., reduce the system noise) of the invention. Although equations (1) and (2) are merely examples, other techniques to determine correlation and similarity can be used.

Thus, the steps of method 100 can provide for a technique with a cluster of computers forms a network with a hierarchical topology, with a Front-End node (FE, parent) and multiple Back-End nodes (BEs, children). Data generated from the BEs are transferred to the FE. The steps can reduce data from the BEs to the FE by removing similar and/or correlated data (redundancy) in time and space based on user-specified tolerance thresholds.

It is noted that the embodiments described herein can be implemented on a BE node, a FE node, or in an environment in between the BE and FE nodes. For example, the invention can be run as a SaaS or the like on the nodes or between the nodes. Or, the invention can be embodied in a memory with instructions to cause a processor to perform the embodiments.

Further, it is noted that the data of the BE nodes is data of which can be correlated or similarities can be obtained. For example, sensor data or the like may be used (i.e., temperature, performance, etc.). Thus, correlation or similarity can be made between the data of each of the BE nodes.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
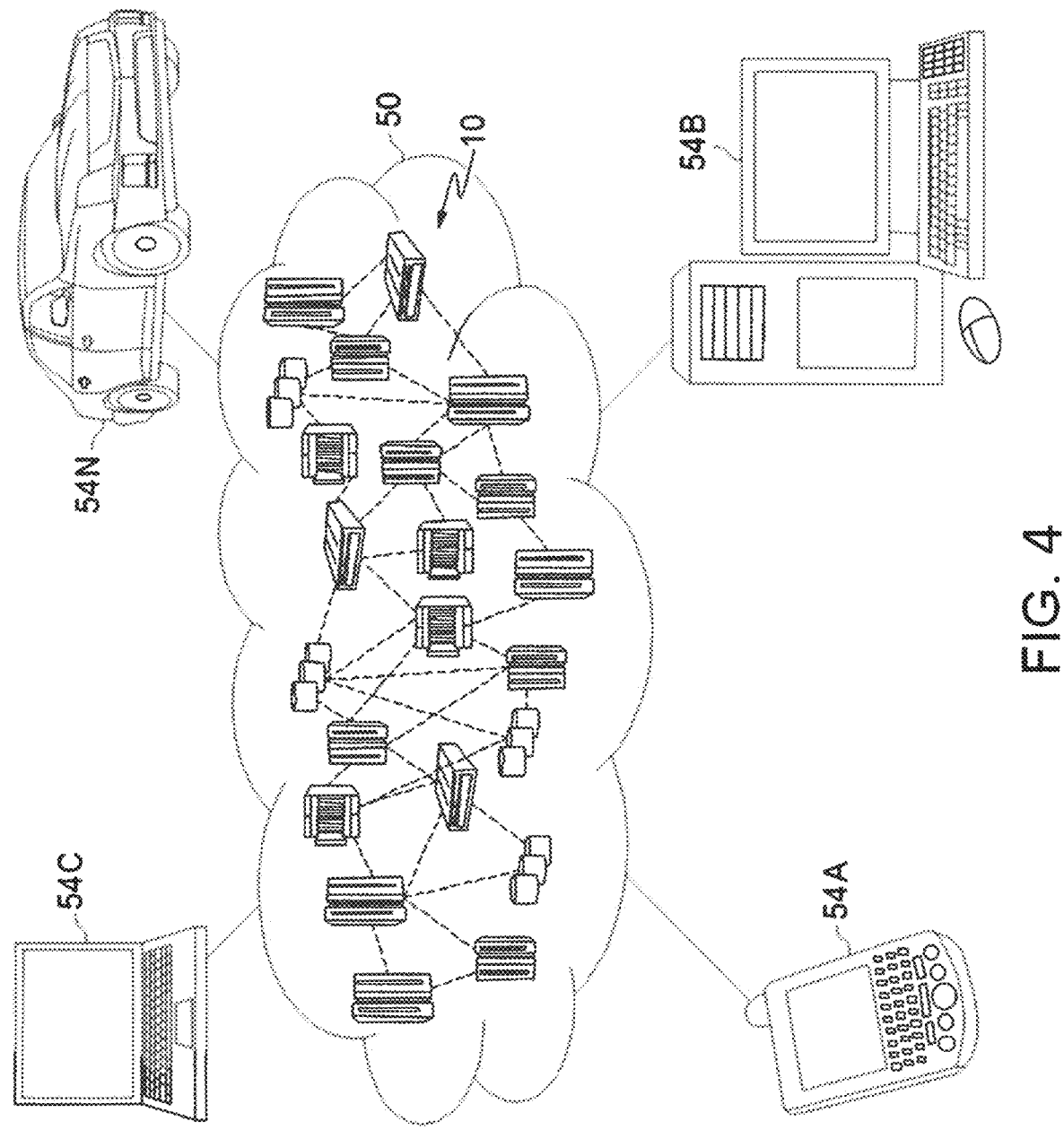
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
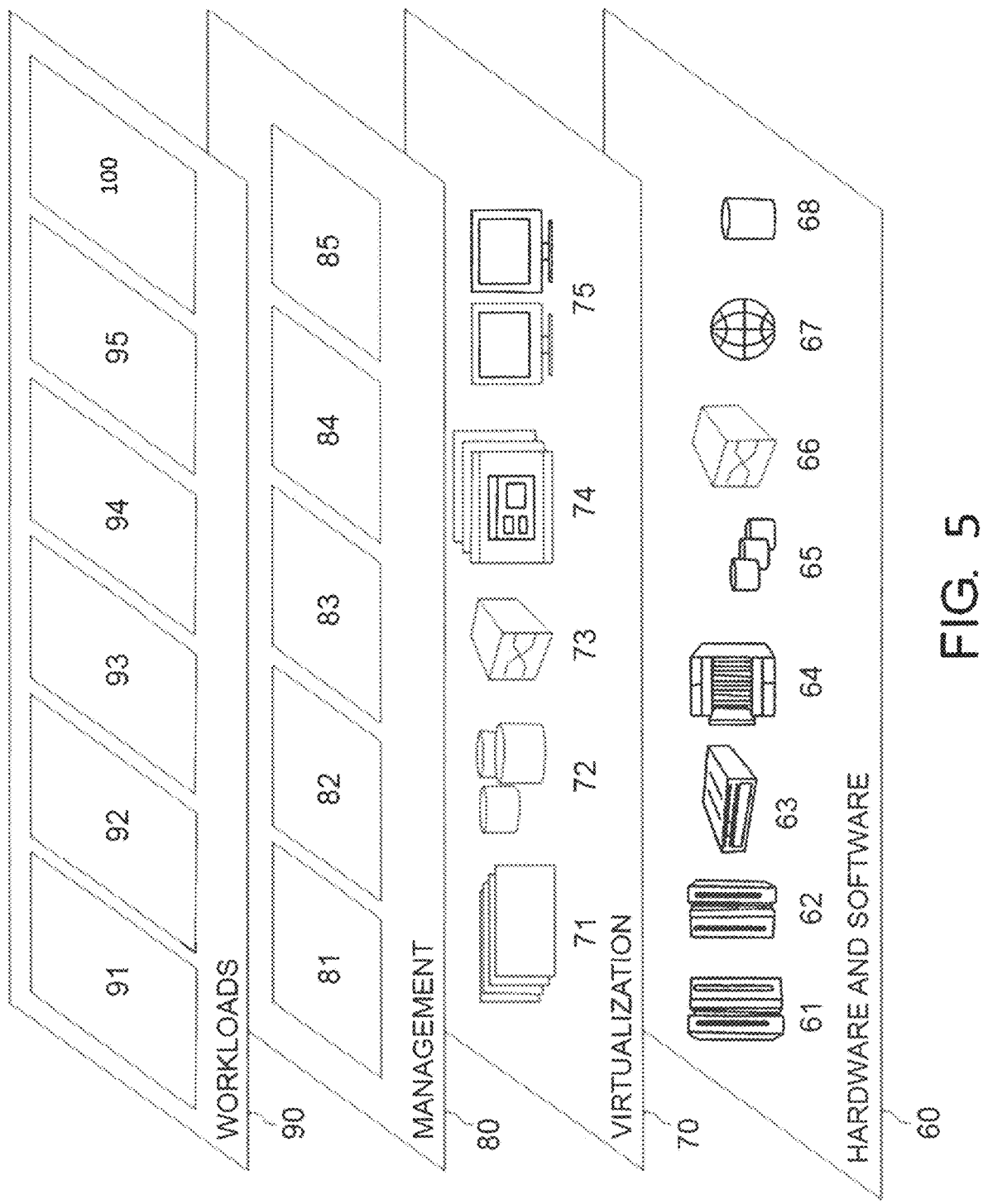
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data-centric reduction method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented data-centric reduction method, the method comprising:
   configuring a similarity threshold and a correlation redundancy threshold for an entire data set from at least two back-end computing nodes;
   reducing the entire data set to a reduced data set from the at least two back-end nodes sent to a front-end computing node by removing data based on the similarity threshold and the correlation redundancy threshold in time and space based on user-specified tolerance thresholds; and after the front-end node receives the reduced data set, reconstructing the entire data set from the reduced data set using the similarity threshold and correlation redundancy threshold.

2. The method of claim 1, wherein a user sets the similarity threshold and the correlation redundancy threshold at the front-end node which propagates to each of the back-end nodes, and
wherein if an individual back-end node's data is correlated with another individual back-end node's data, the other back-end node is made inactive and only the active back-end data streams are sent to the front-end node.

3. The method of claim 1, further comprising:
monitoring a similarity of each of back-end data streams for an individual back-end node;
monitoring a correlation between the back-end data streams of all of the back-end nodes,
wherein the back-end nodes determine the similarity of the back-end data streams for the individual back-end node,
wherein the front-end node calculates correlation coefficients according to the correlation between the back-end data streams to generate a correlation table,
wherein the front-end node calculates correlation coefficients according to a correlation between the back-end data streams to generate a correlation table, and
wherein the reconstructing uses the correlation table at the front-end to reconstruct the entire data set from the reduced data set.

4. The method of claim 1, wherein the front-end node calculates correlation coefficients according to a correlation between the back-end data streams to generate a correlation table, and
wherein the reconstructing uses the correlation table at the front-end to reconstruct the entire data set from the reduced data set.

5. The method of claim 1, wherein the reducing reduces the data set by removing all data points within the similarity threshold from the individual back-end data stream and removing all data points within the correlation redundancy threshold of other individual back-end streams, and
wherein if an individual back-end node's data is correlated with another individual back-end node's data, the other back-end node is made inactive and only the active back-end data streams are sent to the front-end node.

6. The method of claim 5, wherein the eliminated data points via the correlation redundancy threshold are recorded in a correlation table for the reconstructing to utilize the correlation table to reconstruct the correlated data points.

7. The method of claim 1, wherein if an individual back-end node's data is correlated with another individual back-end node's data, the other back-end node is made inactive and only the active back-end data streams are sent to the front-end node.

8. The computer-implemented method of claim 1, embodied in a cloud-computing environment.

9. A computer program product for data-centric reduction, the computer program product comprising a computer-readable storage medium having program instructions embodied therewith, the program instructions executable by a computer to cause the computer to perform:
configuring a similarity threshold and a correlation redundancy threshold for an entire data set from at least two back-end computing nodes;
reducing the entire data set to a reduced data set from the at least two back-end nodes sent to a front-end computing node by removing data based on the similarity threshold and the correlation redundancy threshold in time and space based on user-specified tolerance thresholds; and
after the front-end node receives the reduced data set, reconstructing the entire data set from the reduced data set using the similarity threshold and correlation redundancy threshold.

10. The computer program product of claim 9, wherein a user sets the similarity threshold and the correlation redundancy threshold at the front-end node which propagates to each of the back-end nodes.

11. The computer program product of claim 9, further comprising:
monitoring a similarity of each of back-end data streams for an individual back-end node;
monitoring a correlation between the back-end data streams of all of the back-end nodes,
wherein the back-end nodes determine the similarity of the back-end data streams for the individual back-end node,
wherein the front-end node calculates correlation coefficients according to the correlation between the back-end data streams to generate a correlation table.

12. The computer program product of claim 9, wherein the front-end node calculates correlation coefficients according to a correlation between the back-end data streams to generate a correlation table, and
wherein the reconstructing uses the correlation table at the front-end to reconstruct the entire data set from the reduced data set.

13. The computer program product of claim 9, wherein the reducing reduces the data set by removing all data points within the similarity threshold from the individual back-end data stream and removing all data points within the correlation redundancy threshold of other individual back-end streams.

14. The computer program product of claim 13, wherein the eliminated data points via the correlation redundancy threshold are recorded in a correlation table for the reconstructing to utilize the correlation table to reconstruct the correlated data points.

15. The computer program product of claim 9, wherein if an individual back-end node's data is correlated with another individual back-end node's data, the other back-end node is made inactive and only the active back-end data streams are sent to the front-end node.

16. A data-centric reduction system, said system comprising:
a processor; and
a memory, the memory storing instructions to cause the processor to perform:
configuring a similarity threshold and a correlation redundancy threshold for an entire data set from at least two back-end computing nodes;
reducing the entire data set to a reduced data set from the at least two back-end nodes sent to a front-end computing node by removing data based on the similarity threshold and the correlation redundancy threshold in time and space based on user-specified tolerance thresholds; and
after the front-end node receives the reduced data set, reconstructing the entire data set from the reduced data set using the similarity threshold and correlation redundancy threshold.

17. The system of claim 16, wherein a user sets the similarity threshold and the correlation redundancy threshold at the front-end node which propagates to each of the back-end nodes.

18. The system of claim 16, further comprising:
monitoring a similarity of each of back-end data streams for an individual back-end node;
monitoring a correlation between the back-end data streams of all of the back-end nodes,
wherein the back-end nodes determine the similarity of the back-end data streams for the individual back-end node,
wherein the front-end node calculates correlation coefficients according to the correlation between the back-end data streams to generate a correlation table.

19. The system of claim 16, wherein the front-end node calculates correlation coefficients according to a correlation between the back-end data streams to generate a correlation table, and
wherein the reconstructing uses the correlation table at the front-end to reconstruct the entire data set from the reduced data set.

20. The system of claim 16, embodied in a cloud-computing environment.

* * * * *